United States Patent [19]

Shashaty

[11] 4,289,430

[45] Sep. 15, 1981

[54] METHOD AND APPARATUS FOR SIMULTANEOUSLY BORING AND TURNING UPSET PIPE END

[75] Inventor: Alex Shashaty, Leetonia, Ohio

[73] Assignee: Fairfield Machine Company, Columbiana, Ohio

[21] Appl. No.: 20,366

[22] Filed: Mar. 14, 1979

[51] Int. Cl.³ .................. B23B 35/00; B23B 51/08
[52] U.S. Cl. .................................. 408/1 R; 408/25; 82/2 E
[58] Field of Search ............ 408/22, 24, 25, 1 R, 408/23; 29/27 R, 27 C, 33 T; 82/2 E, 1.4, 1 C, 24 A

[56] References Cited

U.S. PATENT DOCUMENTS

| | | | |
|---|---|---|---|
| 2,486,977 | 11/1949 | Peters | 29/27 R |
| 3,010,344 | 11/1961 | Christenson | 82/24 A |
| 3,902,386 | 9/1975 | Dressler et al. | 82/1.4 |

FOREIGN PATENT DOCUMENTS 305482  2/1955  Switzerland .................. 82/2 E

*Primary Examiner*—Leonidas Vlachos
*Attorney, Agent, or Firm*—Carothers and Carothers

[57] ABSTRACT

The inside diameter and outside diameter of an upset pipe end are simultaneously bored and turned respectively by a combination tool. Boring and cutting elements on the tool are simultaneously disengaged from the pipe end in a controlled manner to taper out the cuts and permit rapid retraction of the tool without contacting the finished surfaces and possibly producing a scratch mark.

8 Claims, 4 Drawing Figures

METHOD AND APPARATUS FOR SIMULTANEOUSLY BORING AND TURNING UPSET PIPE END

BACKGROUND OF THE INVENTION

This invention relates generally to pipe end finishing machinery and more particularly to machinery and methods for boring and turning upset pipe ends.

Metal drill pipes and tubing, such as used for oil or gas wells, are manufactured in sections in rough form with upset or thickened pipe ends. These upset pipe ends must have their inside and outside diameters machined or bored and turned before they can be used in the field to connect adjacent pipe sections.

Generally, the upset drill pipe and tubing ends are bored and turned respectively by a boring head and a turning head. After the desired end portion of the upset pipe end has been bored and/or turned, the boring and/or turning tool must then be retracted from the pipe end. However, if the boring and turning tools are retracted, the machined surfaces are scarred or scratched by the cutting elements thereby providing unacceptable defects in the finished pipe end. To avoid this, the machine operator will back-bore in the direction opposite to that of the first boring operation (he will feed the tools in the reverse direction and bore again while retracting the tools from the pipe end), thereby doubling the required production time for boring and turning an upset pipe end.

In addition, other defects are created in the upset pipe ends after the boring and turning operations are completed, as many times sharp annular shoulders or steps are left on the inside and/or outside of the pipe end. These shoulders are undesirable as they produce stress concentration areas which are particularly susceptible to the effects of corrosion. These defects are unacceptable for use as drill pipe or tubing as in sour gas ($H_2S$) wells, for example.

It is a principal object of the present invention to eliminate these aforementioned disadvantages of the prior art.

SUMMARY OF THE INVENTION

When boring and turning an upset pipe end in accordance with the teachings of the present invention, the pipe is clamped in axial alignment with an axially rotating combination inside diameter-outside diameter (ID-OD) pipe end boring-turning head which has respective ID and OD cutters. The rotating combination head and the upset pipe end to be machined or bored and turned are axially advanced one toward the other for axial engagement, and the upset pipe end is thereby simultaneously bored and turned. Thereafter, the ID cutters are collapsed and the OD cutters are expanded simultaneously out of engagement with the pipe end and then the combination head and the pipe end are axially separated with haste and without the need of back-boring or scarring the already finished surfaces, thereby cutting production time by as much as 95%.

In addition, the ID and OD cutters can be simultaneously retracted gradually thereby tapering out the ID and OD cuts, and respectively blending the cuts to the bore and the outside cylindrical surface of the pipe respectively, thereby eliminating possible stress points in the form of annular shoulders.

Air, or coolant, or a combination of both, under pressure, may also be supplied to the boring head through a central passage for cooling and also clearing of metal chips removed by the cutting tools.

The ID and OD cutting tools are simultaneously retracted by the use of a pull bar or rod which is axially received for sliding within a bore of the combination cutting head. A cross arm is also transversely secured to this pull rod and is permitted to axially slide with the pull rod. Cam surfaces on the end of the pull rod and on the end of pull rods extending from the arm cause the ID cutting tools to radially collapse and the OD cutting tools to radially expand simultaneously when the pull rod is drawn rearward by a suitable mechanism such as a hydraulic cylinder.

BRIEF DESCRIPTION OF THE DRAWINGS

Other objects and advantages appear hereinafter in the following description and claims.

The accompanying drawings show, for the purpose of exemplification without limiting the invention or the claims thereto, certain practical embodiments illustrating the principles of this invention wherein:

DETAILED DESCRIPTION OF THE DRAWINGS

Figure 1:
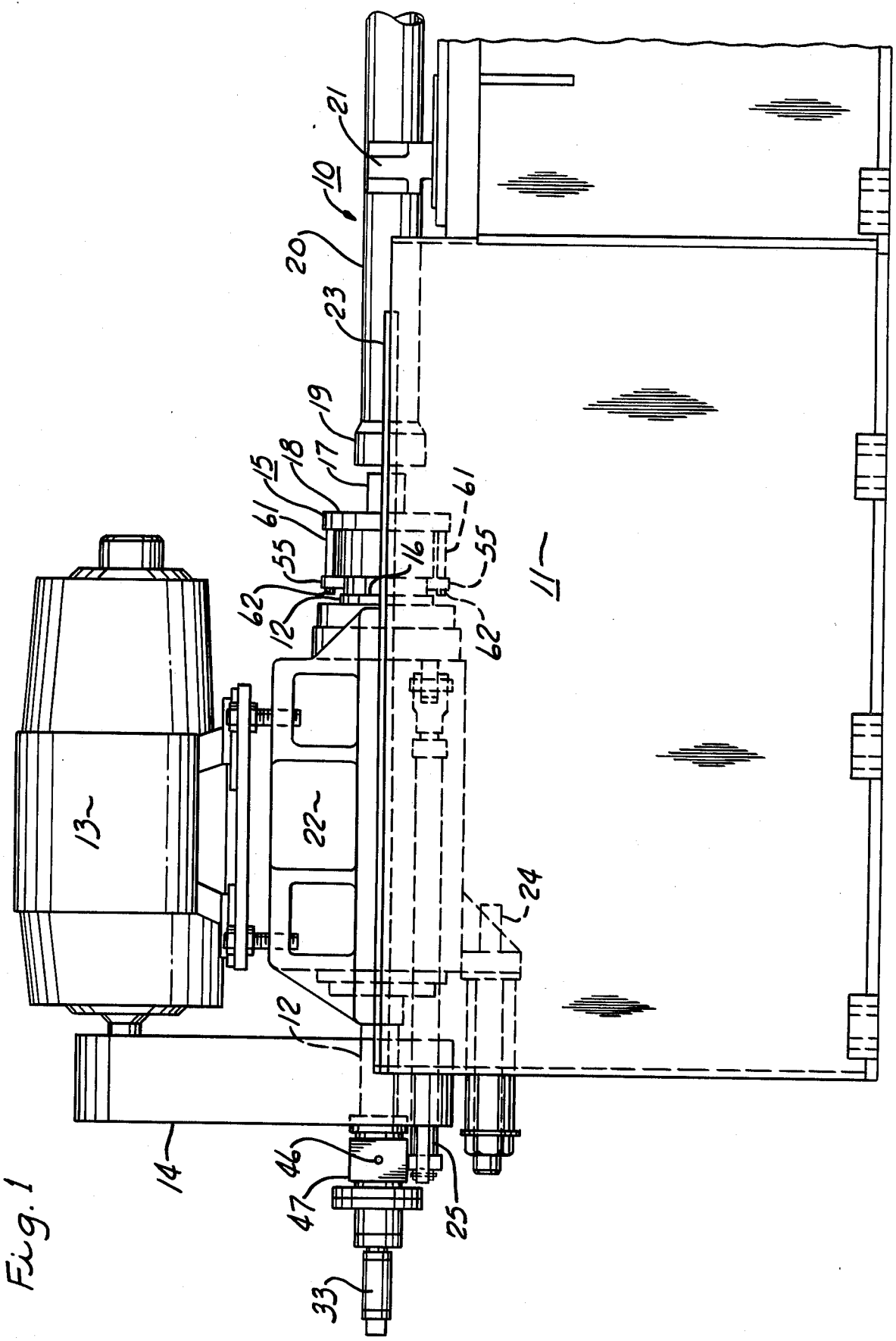
FIG. 1 is a view in side elevation illustrating the combination boring and turning machine for upset pipe ends of the present invention with portions thereof sectioned away.
Figure 2:
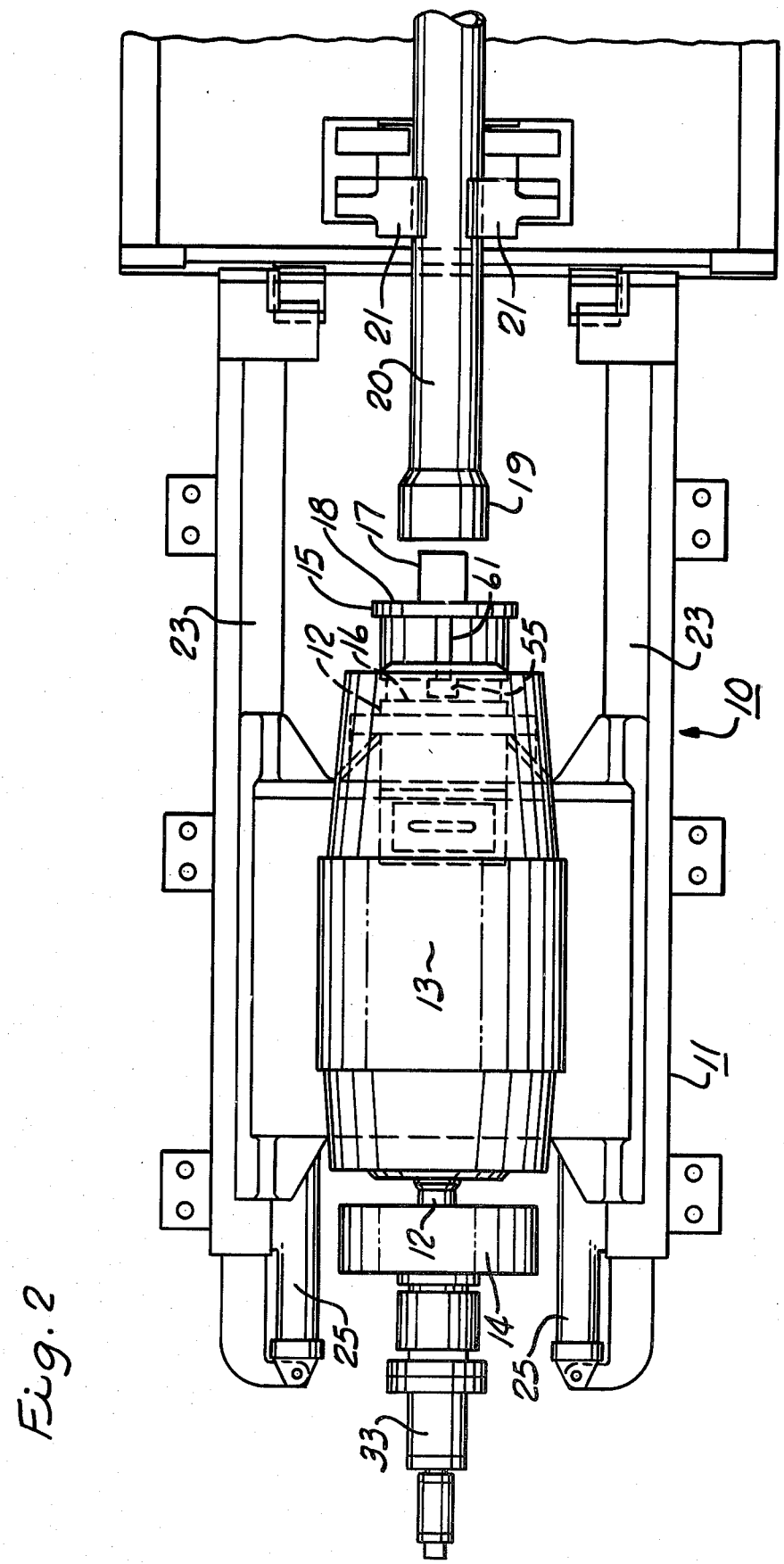
FIG. 2 is a plan view of the boring and turning machine illustrated in FIG. 1.

Referring to FIGS. 1 and 2, the combination boring and turning machine 10 generally comprises support frame 11 having an elongated spindle 12 journaled for rotation on its axis in the frame with a motor 13 mounted on the frame and in rotary driving engagement with the spindle 12 via a conventional pulley-sheave drive enclosed within housing 14. Motor 13 is a variable speed DC motor.

A combination pipe end boring and turning head 15 is secured to the face 16 of drive spindle 12. Head 15 consists of pipe end inside boring head 17, which is axially aligned with and secured to the end of spindle 12, and a pipe end outside turning head 18 which is also secured to the end of spindle 12 and coaxially positioned over the boring head 17 with a clearance therebetween to coaxially receive upset pipe end 19 for simultaneous boring and turning. Pipe 20 is clamped in pipe jaws 21 which are conventionally hydraulically actuated to rigidly secure pipe 20 for the boring and turning operation after it has been properly positioned in relation to the head 15. A second similar set of pipe jaws are employed, but not shown, to further hold pipe 20 in proper axial alignment with the combination boring and turning head 15.

In order to advance the rotating combination boring and turning head 15 axially into boring and turning engagement with upset pipe end 19, spindle 12 is mounted in a portion of frame support 11 in the form of a motor driven carriage 22 which traverses left and right in the figures along tracks 23 and is further guided and steadied by slide guide pins 24. Carriage 22 is shown in its full retracted position, and, of course, combination boring and turning head 15 therewith, or to the full left as viewed in the figures, prior to boring and turning engagement with pipe end 19.

Pipe 20 and spindle 12 are axially aligned with each other and, as previously stated, spindle 12 and head 15 therewith are rotated by motor 13 which rides on top of carriage 22. Thus, when carriage 22 is driven forward or to the right in the figures by hydraulic cylinders 25 in the axial direction of the spindle, the boring and turning head 15 will be driven into a slow feed boring and turning engagement with pipe end 19. In this manner, the outside diameter and the inside diameter of pipe end 19 are simultaneously machined.

Figure 3:
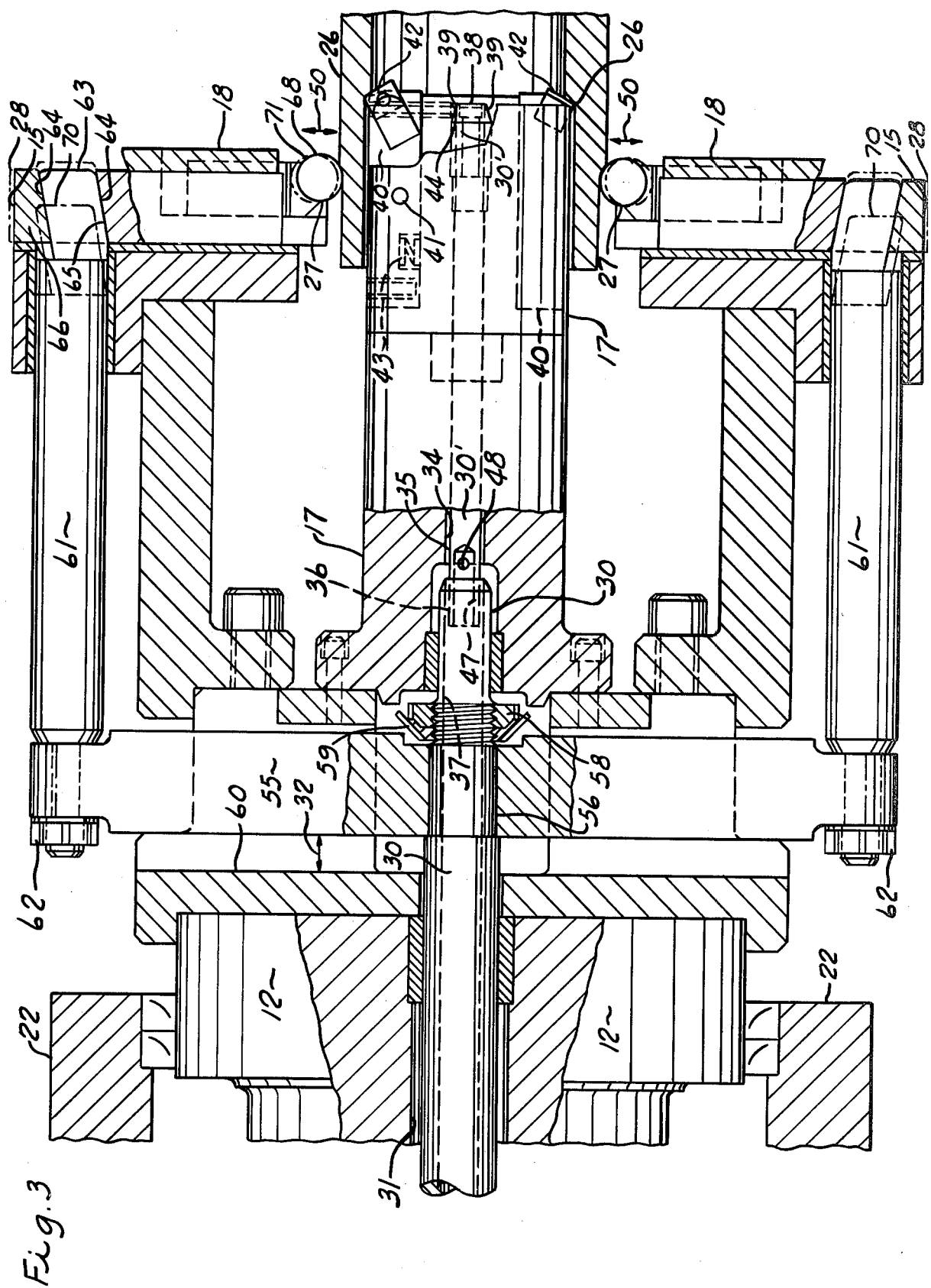
FIG. 3 is an enlarged sectional view in side elevation of the combination boring and turning head utilized in the apparatus of the present invention.
Figure 4:
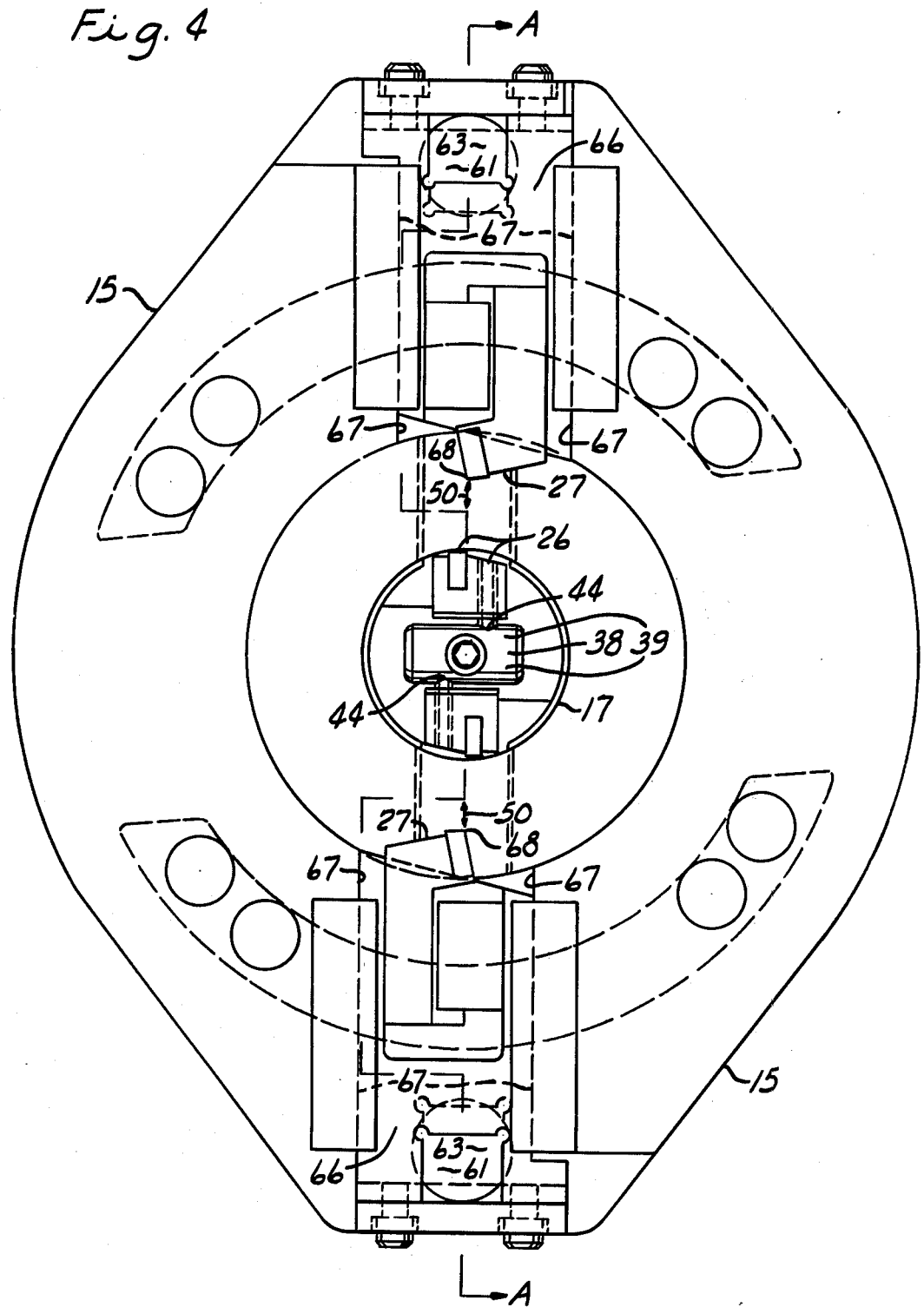
FIG. 4 is a view in a front elevation of the combination boring and turning head illustrated in FIG. 3.

Referring, in addition, to FIGS. 3 and 4, boring head 17 and turning head 18 are respectively provided with radially retractable pipe end boring tools or cutters 26 and turning tools or cutters 27. Boring tool 26 retracts by collapsing radially inward and turning tools 27 are retracted by being simultaneously expanded radially outward as indicated by the phantom outline 28. Pull rod 30 is utilized to simultaneously retract boring tools 26 and turning tools 27. Pull rod 30 is coaxially received within spindle 12 in bore 31 which axially penetrates the entire spindle. Pull rod 30 rotates with spindle 12, but it also is axially slideable within bore 31 for the stroke length indicated by arrow 32. Pull rod 30 is axially retracted or advanced relative to spindle 12 by means of hydraulic rotating cylinder 33 (FIGS. 1 and 2). Pull rod 30 is also provided with an extension 31' which is slideably received in axial bore 34 of boring head 17 with a specially provided clearance 35 which will be explained hereinafter. Pull rod extension 30' is secured to the forward end of pull rod 30 by the threaded engagement indicated at 36 within bore 37 of pull rod 30.

A cam head 38 is secured to the forward end of extension pull bar 30' and is provided with two slanted cam surfaces 39. The cutting tools 26 are in turn biased radially inward against these cam surfaces 39 such that when pull rod 30 and extension pull rod 30' therewith are retracted to the rear or left, boring tools 26 will collapse radially inward.

Boring tools 26 consist of bar-like cutter cartridges 40 which are pivotally secured in their central area to boring head 17 by means of dowel pins 41. The forward end of cartridges 40 carry replaceable cutter inserts 42 which actually engage and cut the inside diameter of the pipe. The rearward ends of cartridges 40 are continually urged radially outward by compression springs 43 such that the forward ends of cartridges 40 are always urged under the pressure of spring 43 radially inward due to the pivot effect about dowel pins 41.

Cam followers 44 are threadably and adjustably received in the forward inside ends of cartridges 40 and they continually ride against cam surfaces 39 of cam head 38 under the bias of springs 43. Cam followers 44 may be threadably adjusted in or out to correctly position cutter inserts 42.

When pull rod 30 and extension rod 30' therewith are retracted, cam followers 44 follow the inward incline of cam surfaces 39 thereby collapsing the cutting tools 26.

As previously indicated, pull rod 30 is provided with an internal bore 37 throughout its entire length. This is for the supply of air or air and mist lubricant under pressure to the forward end of bore head 17. As is seen in FIG. 1, air is supplied via opening 46 into the small housing 47 and by means of conventional passages and channels this air under pressure finds its way into the interior of bore 37 and passes all the way therethrough and then into the short cavity 47 of extension pull rod 30' where it exits out of passage 48 and then continues to flow through the clearance 35 provided between rod 30' and bore 34 and then exits at the forward end of boring head 17 to cool the same and to clear metal chips from the boring area.

Boring head 17 is rigidly secured to turning head 18 which is in turn rigidly secured to the forward face of spindle 12. As may be seen in FIGS. 2 and 4 turning head 18 is coaxially positioned relative to boring head 17 with clearance 50 therebetween to receive the pipe end 19 therebetween for simultaneous boring and turning.

A transverse arm 55 is received on the reduced forward end 56 of pull rod 30 and secured rigidly to pull rod 30 by means of nut 58 which is held in place by lock washer 59. Arm 55 extends transversely through open passages or slots 60 in combination head 15 and thus transverse arm 55 slides to the left or right in unison with pull rod 30 within the clearance 32.

Two turning pull rods 61 have their rearward ends respectively secured to opposite ends of arm 55 by means of nuts 62. The forward ends of turning pull rod 61 are each provided with a cam head 63 which has side cam surfaces 64. Cam head 63 is slideably received in cam follow slot 65 of cam followers 66. Cam followers 66 are permitted to slide radially in and out in guides 67 and carry therewith turning cutters 68.

Thus when pull rod 30 is retracted rearward or to the left, arm 55 and pull rods 61 are retracted therewith to the phantom outline position indicated at 70, thus causing cam follower slide blocks 66 to slide radially outward and carry cutters 68 with them to their retracted position as indicated by the phantom outline 71. In this manner it can be readily seen that boring cutter inserts 42 and turning cutters 68 are simultaneously retracted when pull rod 30 is retracted by means of the motor or hydraulic cylinder 33. The speed of retraction of cylinder 33 is regulated to be gradual when terminating the combination boring and turning operation in order to gradually taper out the ID and OD cuts and thereby eliminate sharp annular stop cut shoulders.

When the cutting tools 26 and 27 are thus fully retracted, carriage 22 is then quickly retracted to the left to axially disengage pipe end 19 from head 15 and the finished pipe is removed from clamps 21 and another pipe is inserted for the next operation.

Due to the fact that the boring and turning tools are fully retracted and no longer engage the tube end 19, head 15 does not have to be retracted at a fine or slow feed rate as is employed when the boring and turning operation is being carried out, thereby eliminating back boring or otherwise scarring the already machined surfaces.

I claim:

1. A combination boring and turning machine for upset pipe ends comprising, a support frame, a spindle journaled for rotation on its axis in said frame, a motor in rotary driving engagement with said spindle, a pipe end inside boring head axially aligned with and secured to one end of said spindle, a pipe end outside turning head secured to said one end of said spindle and coaxially positioned over said boring head for clearance therebetween to coaxially receive a pipe end for simultaneous boring and turning said boring head having a plurality of circumferentially spaced pipe end boring tools and said turning head having a plurality of circumferentially spaced pipe end turning tools respectively, and means to retract said boring tools radially inward out of boring engagement with a pipe end and to retract said turning tools radially outward out of turning engagement with the same pipe end simultaneously.

2. The combination boring and turning machine for upset pipe ends of claim 1 including means on said frame to clamp a pipe in axial alignment with said spindle, and means on said frame to coaxially advance an upset end of a pipe into said clearance for simultaneous boring and turning and to retract said end from said clearance after said retraction of said boring and turning tools.

3. The combination boring and turning machine for upset pipe ends of claim 2, wherein said means to advance and retract includes a motor-driven carriage portion of said frame housing said spindle and movable along a track on said frame in the axial direction of said spindle to axially advance and retract said boring and turning tools relative to said pipe end for simultaneous boring and turning.

4. The combination boring and turning machine for upset pipe ends of claim 1, said means to simultaneously retract said tools including a pull rod slidably received in an axial bore in said boring head and having a cam head secured to one end adjacent said boring tools, said boring tools engaging a slanted cam surface on said cam head such that said boring tools retract radially inward when said rod is axially retracted toward said spindle, the other end of said pull rod secured to an arm transverse to said axis and received in a clearance slot in said turning head for axial displacement relative thereto, a second pull rod secured at one end to said arm and positioned in parallel with said first pull rod, a second cam head secured to the other end of said second pull rod adjacent said turning tools and having a second slanting cam surface engaging said turning tools such that said turning tools retract radially outward when said second pull rod together with said arm and said first pull rod are axially retracted as a unit toward said spindle, and motor means connected to retract and advance said unit.

5. The combination boring and turning machine for upset pipe ends of claim 4, including clearance between said first push rod and said axial bore, and means to supply air under pressure through said bore clearance to the boring tool end of said boring head as a coolant and for clearing of boring chips.

6. A method of simultaneously boring and turning an upset pipe end comprising the steps of, clamping a pipe in axial alignment with an axially rotating combination ID-OD pipe end boring-turning head having respective ID and OD cutters in preparation for boring and turning an upset end of the pipe, axially engaging said rotating combination head and said pipe end and thereby simultaneously boring and turning a portion of said upset pipe end, thereafter simultaneously retracting the ID cutters radially inward and the OD cutters radially outward out of engagement with said pipe end, and then axially separating said combination head and said pipe end.

7. The method of claim 6, the step of simultaneously retracting including the step of retracting said cutters gradually to taper out the ID and OD cuts.

8. The method of claim 6, including the step of flowing air to the boring head.

* * * * *